(12) United States Patent
Gorelik et al.

(10) Patent No.: US 11,373,189 B2
(45) Date of Patent: Jun. 28, 2022

(54) SELF-LEARNING ONLINE MULTI-LAYER METHOD FOR UNSUPERVISED RISK ASSESSMENT

(71) Applicant: EMC IP Holding Company LLC, Hopkinton, MA (US)

(72) Inventors: Boris Gorelik, Mazkeret Batya (IL); Marcelo Blatt, Modiin (IL); Liron Liptz, Even Yehuda (IL); Yael Villa, Tel Aviv (IL); Alon Kaufman, Herut (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/455,937

(22) Filed: Jun. 28, 2019

(65) Prior Publication Data

US 2019/0325451 A1 Oct. 24, 2019

Related U.S. Application Data

(63) Continuation of application No. 14/227,766, filed on Mar. 27, 2014, now abandoned.

(51) Int. Cl.
*G06Q 20/40* (2012.01)
*H04L 9/32* (2006.01)

(52) U.S. Cl.
CPC ......... *G06Q 20/4016* (2013.01); *G06Q 20/40* (2013.01); *H04L 9/32* (2013.01)

(58) Field of Classification Search
CPC ....... G06Q 20/4016; G06Q 20/40; H04L 9/32
See application file for complete search history.

(56) References Cited

U.S. PATENT DOCUMENTS

| 6,119,103 | A | 9/2000 | Basch et al. | |
|---|---|---|---|---|
| 6,330,546 | B1 | 12/2001 | Gopinathan et al. | |
| 6,430,539 | B1 * | 8/2002 | Lazarus | G06Q 30/02 |
| | | | | 705/14.1 |

(Continued)

FOREIGN PATENT DOCUMENTS

| CA | 2726790 A1 * | 7/2011 | ............. G06N 20/20 |
|---|---|---|---|
| WO | WO 001/17799 * | 3/2000 | ............. G06F 17/60 |
| WO | WO-0017799 A1 * | 3/2000 | ............. G06Q 40/08 |

OTHER PUBLICATIONS

Beasley et al.: Developing Key Risk Indicators to Strenghthen Enterprise Risk Management, Dec. 2010, COSO, pp. 1-20 (Year: 2010).*

(Continued)

*Primary Examiner* — Bijendra K Shrestha
(74) *Attorney, Agent, or Firm* — BainwoodHuang

(57) ABSTRACT

A method of protecting a computer system from fraudulent use includes collecting and aggregating sets of risk predictor values for user-initiated events into user-specific aggregations and organization-wide aggregations, and in response to a current event initiated by a user, generating a risk indicator as a combination of a user-specific indicator and an organization-wide indicator based on current event parameters and the user-specific and organization-wide aggregations. Based on the risk indicator indicating that the current event may be a fraudulent use, a protective control action is taken (such as denying or modifying a requested access) to protect the computer system.

6 Claims, 5 Drawing Sheets

(56) References Cited

U.S. PATENT DOCUMENTS

| | | | |
|---|---|---|---|
| 8,280,833 | B2 | 10/2012 | Miltonberger |
| 8,290,789 | B2 | 10/2012 | Wennberg |
| 8,418,249 | B1 | 4/2013 | Nucci et al. |
| 9,608,997 | B2* | 3/2017 | Nicodemus ............ G06F 21/55 |
| 10,248,915 | B2* | 4/2019 | Foley .................... G06Q 10/06 |
| 2006/0100957 | A1 | 5/2006 | Buttler et al. |
| 2007/0289013 | A1 | 12/2007 | Lim |
| 2008/0288330 | A1* | 11/2008 | Hildebrand ........ G06Q 10/0635 705/7.28 |
| 2010/0280927 | A1 | 11/2010 | Faith et al. |
| 2011/0054961 | A1* | 3/2011 | DelZoppo .......... G06Q 10/0635 705/7.28 |
| 2011/0137131 | A1 | 6/2011 | Adourian et al. |
| 2013/0239217 | A1* | 9/2013 | Kindler ............... G06F 16/9024 726/25 |
| 2013/0311231 | A1 | 11/2013 | Morinaga et al. |
| 2015/0026027 | A1* | 1/2015 | Priess ................ G06Q 20/4016 705/35 |
| 2015/0040665 | A1* | 2/2015 | Borkholder ............. G01P 15/14 73/510 |
| 2015/0106265 | A1* | 4/2015 | Stubblefield ....... G06Q 20/4016 705/44 |
| 2015/0213449 | A1* | 7/2015 | Morrison ........... G06Q 20/4016 705/44 |

OTHER PUBLICATIONS

Benjamin et al.: Risk Feedback: An Important Step in Risk Communication, Nov. 1990, Journal—American Water Works Association, pp. 1-7 (Year: 1990).*

Islam et al.: Fraud Detection in ERP Systems Using Scenario Matching, 2010, International Federation of Information Processing, pp. 112-123. (Year: 2010).*

Kaplan et al.: Managing Risks: A New Framework, Jun. 2012, Risk Management, Harvard Business Review, pp. 1-27 (Year: 2012).*

* cited by examiner

SELF-LEARNING ONLINE MULTI-LAYER METHOD FOR UNSUPERVISED RISK ASSESSMENT

BACKGROUND

The invention relates to the field of information security systems, and in particular to information security systems employing explicit risk assessment as a factor in controlling computer system operation.

A Risk Engine (RE) is a machine learning technology that utilizes a potentially large number of indicators to evaluate the risk of an activity in real-time. In known systems adaptive behavior of a risk engine relies on reliable fraud and authentication feedback and is leveraged to its full extent when some of the feedback is provided by professional analysts. In such a setting, a risk engine is capable of assessing risk level of a transaction based on the risk history (including outcomes) of the organization that deploys the system. The risk engine employs a risk model based on information specific to users, devices, cookies or other instances, which is kept and maintained by profile databases and used to calculate risk scores. Model tuning is performed periodically based on explicit fraud and authentication feedback.

SUMMARY

At least three problems may arise in relation to current use of risk engine technology. First of all, manual feedback (case management) may be impractical in many use cases, limiting the deployment of RE systems in valuable market areas. One example of such unsupervised environments is enterprise authentication. This is in contrast to certain higher-risk and perhaps higher-value use cases such as online banking, for which there is normally a cadre of security professionals analyzing cases of suspected fraud and providing valuable feedback to risk assessment algorithms being used by a risk engine. Secondly, there can be a non-trivial balance between organization- and user-specific patterns, as well as patterns known from previous knowledge. For example: in a multinational company it is normal to observe user log-in sessions performed from many geographical locations. However, most individual users have their own log-in patterns that are not taken into considerations. Another problem with the existing approach is the update frequency, leading to the fact that the speed at which the model reacts to the real-life changes is limited to the time period between model updates.

A new method of risk assessment is disclosed that does not depend on explicit feedback, (i.e., it is an unsupervised approach), is instantly self-updating (online) and is based on multiple levels of behavioral history. In one arrangement, a two-level history is used: organization-wide and user-specific history. Deeper structures are possible, such as a four-level history for Organization, Division, Department, User. This method can use the same kinds of input facts and infrastructure used by conventional supervised risk engine implementations, including for example user and device profiles. Also, it may be usable either as a stand-alone risk scoring component or as an adjunct providing additional predictor inputs to a conventional supervised technique.

In particular, a method of operating a risk engine computer includes maintaining counts of occurrences of risk predictor values for respective risk predictors in connection with risk assessment operations for transactions involving users from a population. The counts are used to calculate sets of frequency values including first and second sets of frequency values, wherein the frequency values of each first set are frequencies of occurrence of the risk predictor values for the o elation of users and the frequency values of each second set are frequencies of occurrence of the risk predictor values for a corresponding user.

The method further includes performing risk assessment operations, each including the following: (1) receiving a request for the risk assessment operation from an agent in a protected computer system, the request relating to a current transaction involving a given user and a given set of current values of risk predictors related to the transaction: (2) calculating a risk score based on the counts for the liven user and the given set of current values of the risk predictors, the calculating having explicitly weighted first and second components, the first component being user-independent and reflecting the frequencies of the first set for the second component being user-dependent and reflecting the frequencies of the second set for the current values of the risk predictors for the given user; and (3) returning a risk assessment response to the agent, the risk assessment response including the risk score or a value derived therefrom usable by the agent to selectively prevent, allow, or modify the current transaction by the user.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

The following description uses an adaptive authentication process as a usage example. However, the method can be easily deployed to other scenarios. More generally, a probabilistic framework for risk assessment is described that assigns anomaly (risk) scores to events in time: the higher the score, the more anomalous (less probable) the event is.

Figure 1:
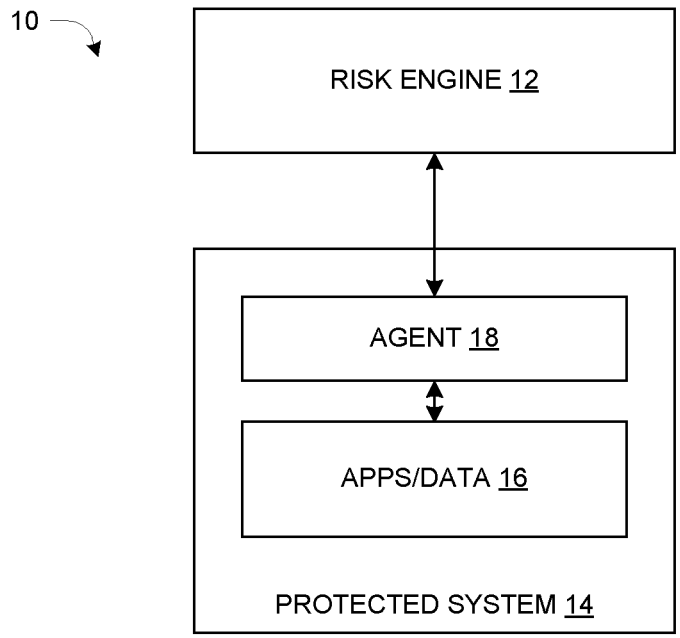
FIG. 1 is a block diagram of a computer system.

FIG. 1 shows a computer system 10 including a risk engine computer or "risk engine" 12 coupled to a protected computer system 14, which may be an individual computer or a collection of computers such as a server farm of an organization. The risk engine 12 includes computer hardware executing a risk engine application (software). The protected system 14 includes applications and data (APPS/DATA) 16 and a separate risk agent (AGENT) 18 in communication with the risk engine 12.

The applications and data 16 are typically providing some type of information service, such as an online service, to a population of users such as a set of private subscribers or the employees of a company for example. The risk engine 12 and agent 18 provide security based on explicit assessment of risk levels of activities/events. Thus in one embodiment, for example, upon an initial access (e.g., login) to a service provided by the apps/data 16, the agent 18 is invoked with parameters of the login as well as other information to obtain a risk assessment as a condition of granting access. The agent 18 in turn makes a request for the risk assessment to the risk engine 12, which performs a risk assessment operation and returns a response. The response may be a so-called "risk score" identifying a level of risk as a numerical value, and the returned value is further processed by the agent 18 and/or the service to arrive at a final decision whether to grant or deny access. In some cases a soft decision might be made, and more information obtained as a condition of granting access. Alternatively, the response from the risk engine 12 may reflect further processing of a raw risk score, and could itself convey a hard access decision.

The focus of this description is operation of the risk engine 12. Very generally, it operates by calculating and combining risk assessments based on the following three questions:

1. How is the current event unlikely to happen in the entire population (for example: employee of USA-based company tries to log in from Europe)?
2. How is the current event unlikely to happen for a particular user (for example: George, who usually uses PC, logs in using a Mac)?
3. How is the current event risky in a more general way, regardless of specific history of the population (for example: new users may generally be considered riskier than long-existing users)?

Components that are related to the first two questions are dynamic ones, meaning that they react to the event history, while the last component is static and is a part of general policy. The relative weight of each of the three components can be configurable according to needs. Risk associated with each dynamic component is calculated as a ratio between two respective counters. In the case of the first component (comparison to entire population) this is the ratio between the number of times that a current event occurred in the population divided by the total number of occurrences of all events in a category. For example: number of log-ins from a specific ISP divided by the total number of log-ins (for all ISPs). In the case of the second component (individual pattern) the ratio is between the number of times the event has been observed for this user and the total number of all events for this user, for the given category. For example: number of times George logged-in using a Mac divided by the total number of log-ins for George. The last (static) component of the model can be calculated using historical data on normal behavior or data on known fraud patterns, or it can be set in a more arbitrary or ad hoc manner as a part of security policy.

Figure 2:
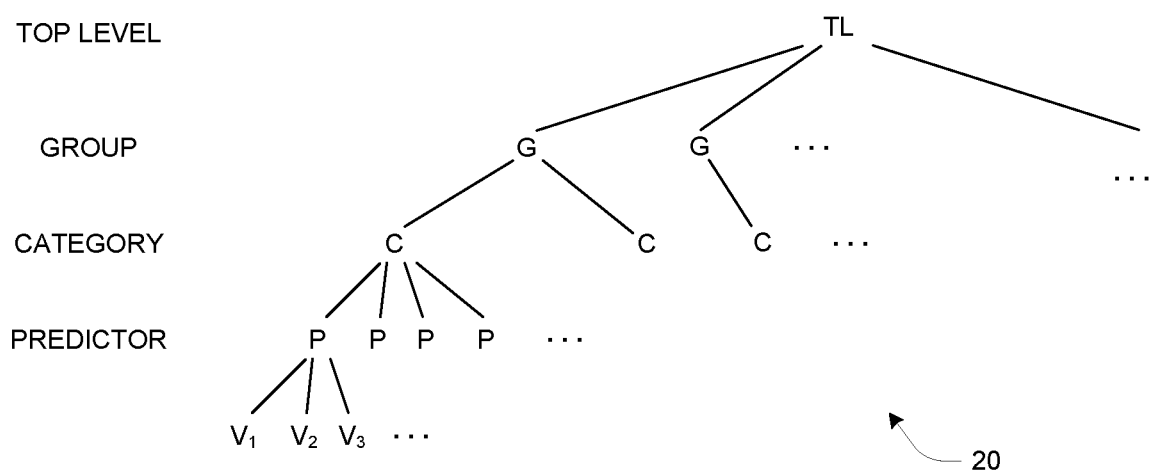
FIG. 2 is a schematic diagram of a risk model.

FIG. 2 depicts a risk model 20 used by the risk engine 12. The model 20 can be viewed as a layered model in which the nodes belonging to each layer compute a function of the inputs carried on the in-edges and send the output on the out-edges. The bottom layer is the input data for "predictors" P, and the node function at this level is to assign the input data to counts of predictor values Vx also referred to herein as "buckets". Predictor buckets are combined into categories C at a next higher level. In principle the category bucket set is the Cartesian product of the predictors that integrate it. In practice it may be a sparse set, although it is not always a sparse set. Risk score is calculated for each category based on the counter values for each bucket. Additional computational step may be applied on the resulting ratio value, for example normalization to the number of buckets that build up a category. At a next higher group (G) level, categories are grouped and explicit group scores are calculated and used. Group score may be determined for example by computing a maximum of the separate risk scores for the constituent categories. At the top (TL) level, overall risk is calculated from the group scores, for example by calculating a weighted average thereof.

The specific arrangement in FIG. 2 is not exclusive of other possible arrangements. In particular, in some embodiments there may be value in supporting a separate entity (E) level between the G and TL levels. This would represent aggregation/calculation across each of a set of organizations or other entities however defined.

Below is presented a mathematical description of aspects of operation of the risk engine 12 according to the risk model 20. In this description, the variable "p" refers to an individual distinct predictor P. Predictors P may be assigned to multiple categories C. Each category C has a set of predictors P. A vector ci is defined as a specific realization of category C, where i is an index associated with each predictor combination. In order to simplify the notation it is denoted simply "$c_i$". Additionally, the users are referred to by the variable "u".

Figure 3:
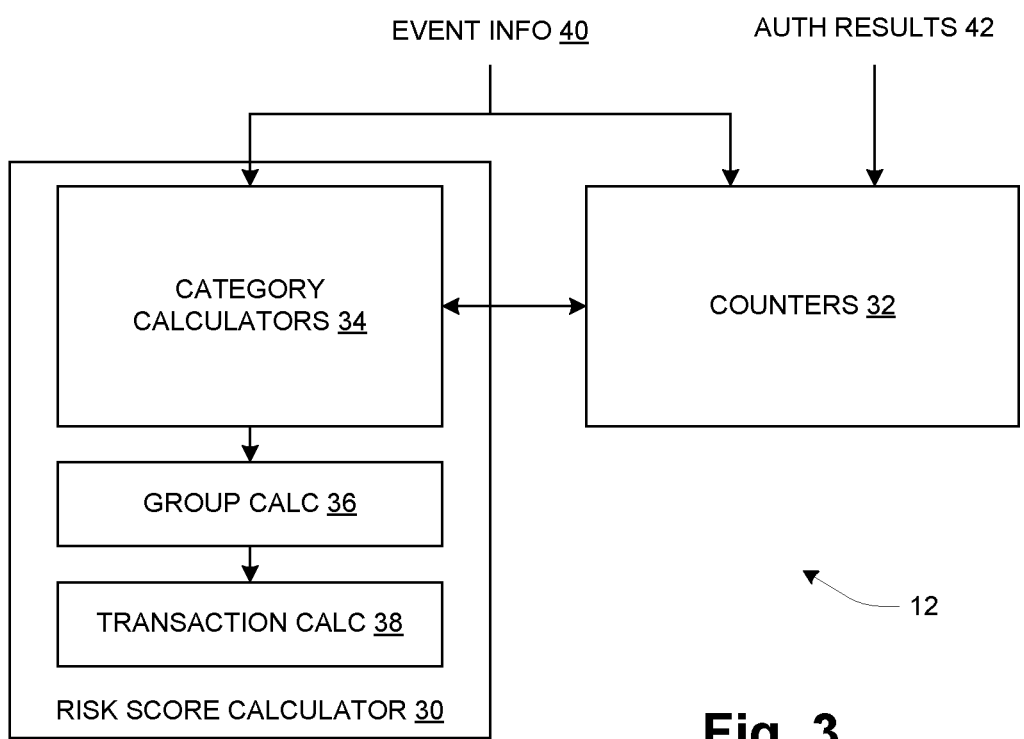
FIG. 3 is a block diagram of a risk engine from a software perspective.

FIG. 3 shows organization of the risk engine 12. It includes a risk score calculator 30 and a set of counters 32. The risk score calculator 30 includes a set of category calculators 34, a group score calculator (GROUP CALC) 36, and a top-level or "transaction" score calculator (TRANSACTION CALC) 38. As shown, both the risk score calculator 30 and the counters 32 receive event information (EVENT INFO) 40, and the counters 32 also receive authentication results (AUTH RESULTS) 42. The event information 40 is information pertaining to a risk score calculation being performed by the risk engine 12, also referred to as a "risk assessment operation" herein. The event info includes, among other things, input data usable to calculate current values Vx for predictors P. For example, one predictor may be the number of unsuccessful login attempts by a user over a recent period. In this case, the event information 40 includes current information about unsuccessful recent login attempts by the particular user involved in the transaction for which the current risk assessment is being performed. It is noted that the authentication results 42 are not used in current calculations, nor are they tracked over time as part of the learning or updating aspect of operation. They may be used in some embodiments to indicate whether the information for a current operation should be used to update the counters 32, reflecting a view that information for failed authentications should not be used because it may diminish accuracy of risk score calculations.

At a high level, the risk engine 12 basically tracks statistics via the counters 32 and uses the risk score calculator 30 to make probability calculations based on those statistics. Operation has an inherent learning aspect just by tracking detailed statistics for predictors P over a long period of system operation. One benefit of this approach, as mentioned above, is that there is no need for explicit feedback about the actual outcomes of authentications or other higher-level security operations for which risk scores have been calculated. The presently disclosed "unsupervised" technique may be used as an adjunct with the known "supervised" techniques that rely on receiving and incorporating such explicit feedback for future operation.

Figure 4:
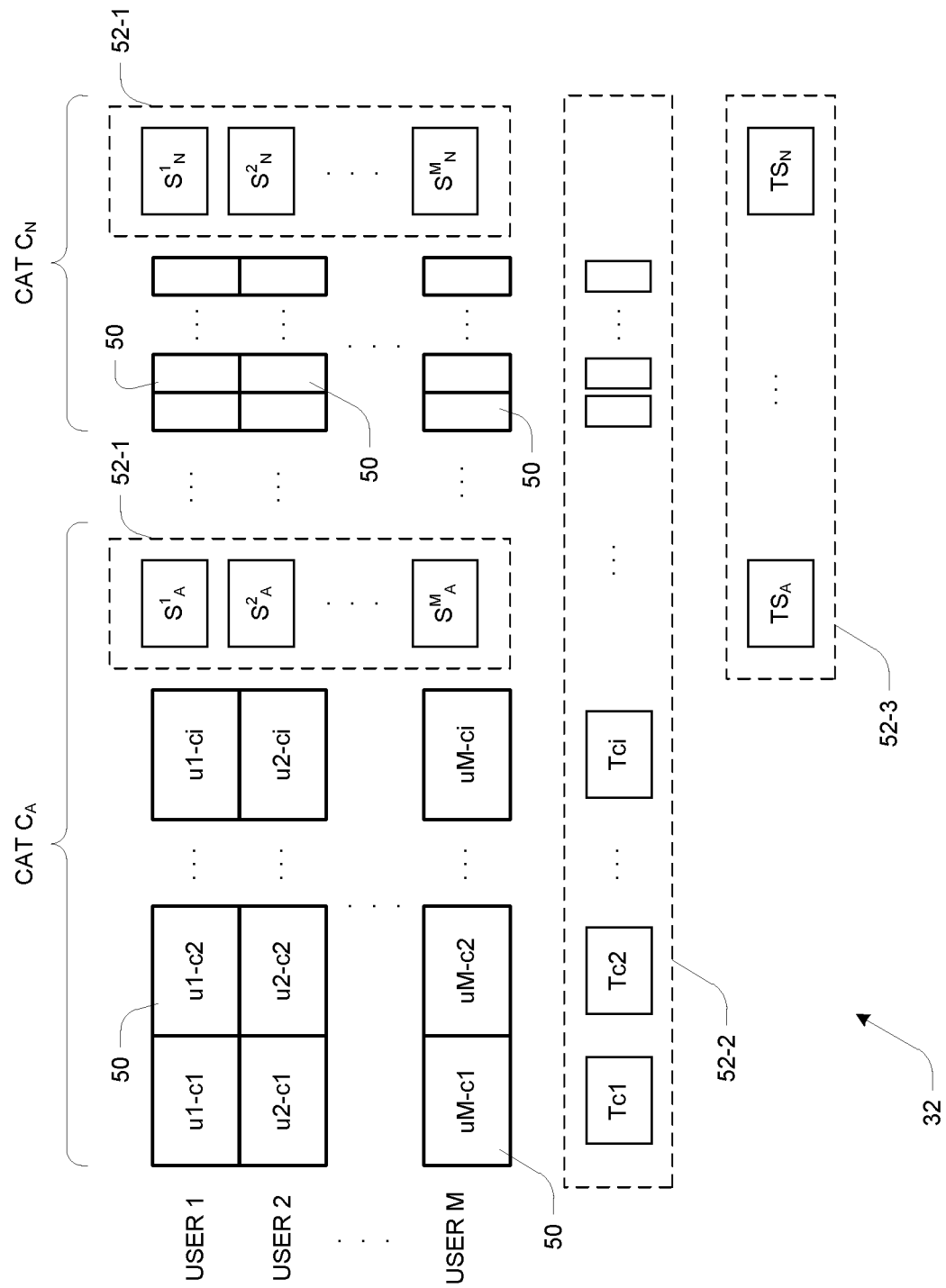
FIG. 4 is a schematic diagram of a set of counters.

FIG. 4 is a schematic diagram of the counters 32. It includes an array of "primary" counters 50, which may be identified by labels um-ci where m and i are index values. A value M corresponds to the number of users in the population. The index i ranges according to the number of category buckets as explained more below. As shown, the primary counters 50 are arranged according to the categories C (shown as $C_A, C_B, \ldots C_N$).

Also shown in FIG. 4 are what are referred to as secondary or "derived" counters 52 that are used to track certain aggregate counts. A first type of derived counter 52-1 is identified as $S^m_n$, and there is one of these counts per category-user pair. Each tracks the total number across all category buckets of the respective category for the respective user. A second type 52-2 is identified as Tci, and there is one of these per category bucket. Each tracks the total number for the category bucket across all users. A third type 52-3 is identified as TSx, and there is one of these per category. It tracks the total number across all users and all category buckets of the respective category.

Formal Description for Per-Category Risk Score Calculations

The risk score of the i-th value of category C for user u is given by $$R_{c_i}^u = \beta_c P(\overline{c_i}) + (1-\beta_c) P(\overline{c_i}|u) \quad (1)$$

where $\beta_c \in [0, 1]$ is a fraction parameter (potentially configurable) that provides the relative weight of "global" and "user" anomaly values; $P(\overline{c_i})$ is the probability of not seeing the i-th value of category C in the overall population and $P(\overline{c_i}|u)$ is the probability of not seeing the i-th value of category C in user u:

$$P(\overline{c_i}) = 1 - P(c_i) \quad (2)$$

$$P(\overline{c_i}|u) = 1 - P(c_i|u) \quad (3)$$

Where $P(c_i|u)$ is the probability of $c_i$ occurring given user u, and $P(c_i)$ is the probability of $c_i$ occurring across the entire user population.

$P(c_i)$ may be assumed to be of the form:

$$P(c_i) = \gamma_c + P_A(c_i) + (1-\gamma_c) P_{c_i}^0 \quad (4)$$

where $P_A(c_i)$ is a dynamic or "adaptive" probability value for $c_i$ and $P_{c_i}^0$ is a static a priori probability for $c_i$. The relative weight between $P_{c_i}^0$ and the adaptive probability of $c_i$ is controlled by the parameter $\gamma_c$. The $P_{c_i}^0$ term is associated with question #3 above.

The probabilities in eq. 2 and eq. 3 are estimated from frequencies associated with each of them:

$$P(c_i | u) = \frac{N_{c_i}^u}{S_C^u} \quad (5)$$

$$P_A(c_i) = \frac{T_{c_i}}{TS_C} \quad (6)$$

where $N_{c_i}^u$ are estimations of number of events for which user u hit the i-th value of category c in a given time window (tracked by the primary counters 50), and S, T and TS are the derived counts 52 described above:

$$S_c^u = \Sigma_{c_j \in C} N_{c_j}^u \quad (7)$$

$$T_{c_i} = \Sigma_u N_{c_i}^u \quad (8)$$

$$TS_c = \Sigma_{c_j \in C} \Sigma_u N_{c_j}^u \quad (9)$$

Using expressions 2, 3 and 4, the score (1) can be re-written as $$R_{c_i}^u = \beta_c [1 - \gamma_c P_A(c_i) - (1-\gamma_c) P_{c_i}^0] + (1-\beta)(1 - P(c_i|u)) \quad (10)$$

where the term $\beta_c [1 - \gamma_c P_A(c_i) - (1-\gamma_c) P_{c_i}^0]$ is the global part of the model, while the term $(1-\beta_c)(1-P(c_i|u))$ is the individual part (user-specific).

A specific example below provides illustration for the above description. As mentioned above, for a given transaction involving a given user, the individual $R_{c_i}^u$ scores are grouped and explicit group (G) scores are calculated and used. Group score may be determined by computing a maximum of the separate risk scores for the constituent categories. At the top (TL) level, overall risk is calculated from the group scores, for example by calculating a weighted average thereof.

Aging of Event Counts

It is desirable to apply aging to the event counts to allow the system to adapt over time. Aging effectively provides a higher weighting of more recent events than more distant events in the past. In one embodiment an exponential decay may be employed for aging. The estimation of the total number of events in a window-time d at time t is given by the recursive relation $$N^{(t)} = \eta^{(t_k)} + \alpha^{\Delta t} N^{(t-\Delta t)} \quad (11)$$

where $N^{(t-\Delta t)}$ denotes the value of the last update of the number of events estimate that took place at time and $(t-\Delta t)$ and $\eta^{(t_k)}$ is the event weight of the $k^{th}$ transaction. In the simple counting scenario, all $\eta$ values equal 1. The decay factor is given by $$\alpha = \frac{1}{e^d} \quad (12)$$

This expression is valid under the assumption of continuous time. In the case it is discrete, the decaying factor becomes $$\alpha = \frac{d-1}{d} \quad (13)$$

Initial Values

Theoretically, the initial counter value should be zero (i.e. $N^{(t=0)}$. At a constant event rate (i.e. $\Delta t$=const) with exponential weighting, the counter value approaches an asymptote:

$$\lim_{t \to \infty} N^{(t)} = \lim_{t \to \infty} \frac{(\alpha^{\Delta t})^t - 1}{\alpha^{\Delta t} - 1} = \frac{1}{1 - \alpha^{\Delta t}} \quad (14)$$

The time it takes to get to the asymptote depends on the event rate and on $\alpha$. It can be shortened by setting $N^0 \leftarrow N^{(t=0)} = (1-\alpha^{\Delta t})^{-1}$. The source of this parameter can be a result of some preliminary study (for example: average number of logins in a certain period of time), theoretical analysis of a suggested model (for example: expected event rate at equilibrium) or corresponding N value from the same model applied on a different instance (for example: values from model acting on Bank A transferred to Bank B). Thus, a model that is based on these counters is expected to show reasonable performance immediately, without waiting for counter values to reach operational values. At the same time, the use of aging also ensures model accommodation to user and corporate history and that any incorrectly assigned initial values will eventually fade out and not interfere with model performance.

Explicit Evolution Equations

The recursive expression (11) can be written explicitly as $$N^{(t)} = \sum_{k \geq 1} \alpha^{t-t_k} \eta^{(t_k)} + N^0 \alpha^{t-t_1}, \quad (15)$$

where $t_k$ is the time-stamp of the $k^{th}$ transaction; $t_1$ is the time stamp of first appearance.

Asynchronous Calculation

A possible scenario that should be addressed is batch learning where a batch file is used to train the system post factum. The update in this case is as follows $$N^{(t^l)} = \sum_{k \geq 1} \alpha^{t^l-t_k} \eta^{(t_k)} + \alpha^{t^l-t} N^{(t_k)}, \quad (16)$$

where $t^l$ is the learning time–the maximum time among all the known transactions.

Figure 5:
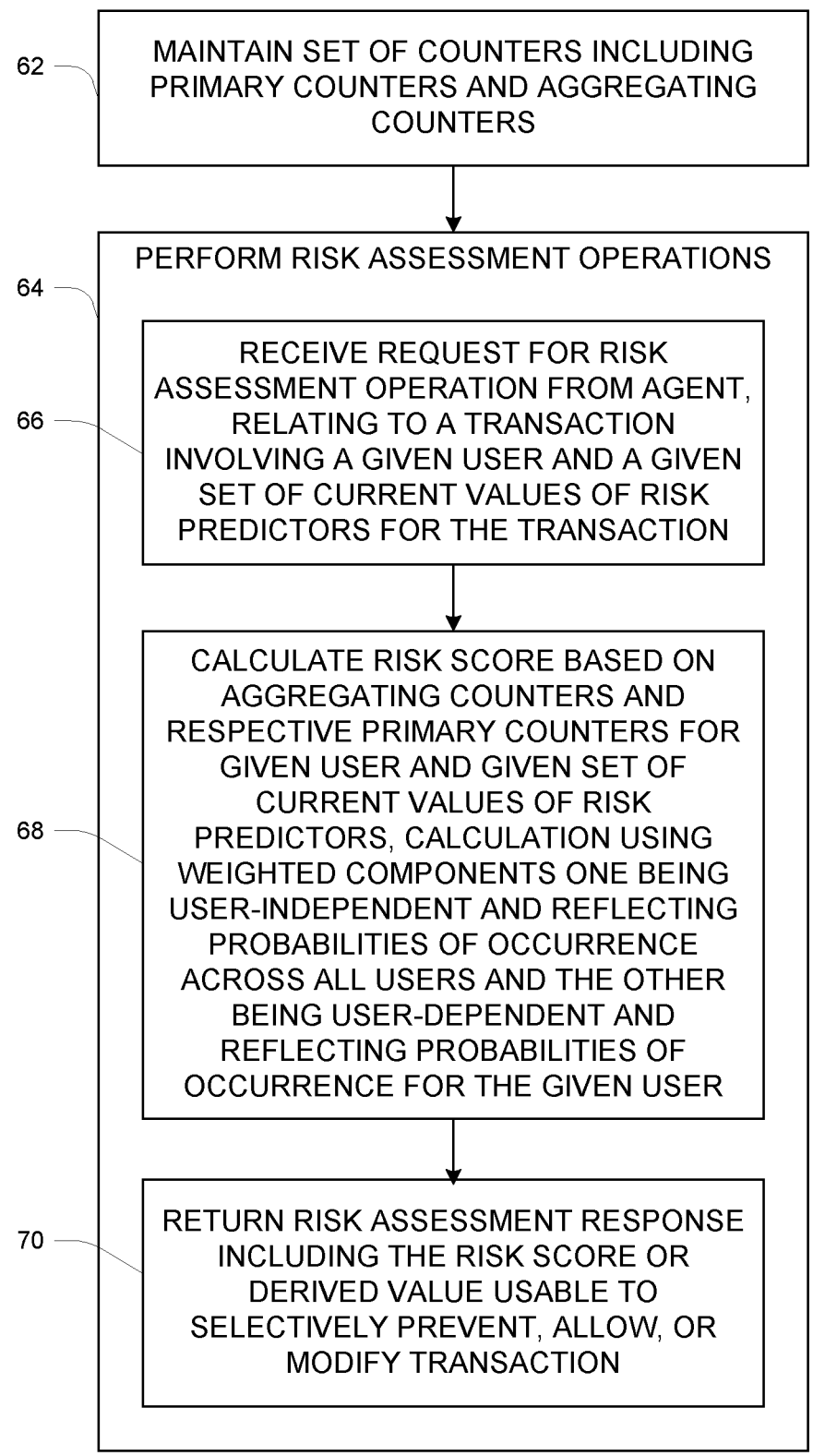
FIG. 5 is a flow diagram of high-level operation of the risk engine.

FIG. 5 illustrates operation 60 of the risk engine 12 at a high level.

At 62, the set of counters 32 is maintained including the array of primary counters 50 and the set of aggregating counters 52. As described above, the primary counters 50 track occurrences of respective values of risk predictors in connection with risk assessment operations for transactions involving respective users over an operating period, and the aggregating counters 52 track aggregate counts of (i) all risk predictor values in respective categories for respective users, (ii) all risk predictor values for respective risk predictors, and (iii) all risk predictor values in respective categories.

At 64, risk assessment operations are performed. Each includes steps 66, 68 and 70 as shown.

At 66, a request is received for a risk assessment operation from an agent 18 in a protected computer system 14, the request relating to a transaction involving a given user and a given set of current values of risk predictors related to the transaction.

At 68, a risk score is calculated based on the aggregating counters 52 and the respective primary counters 50 for the given user and the given set of current values of the risk predictors. The calculation uses weighted first and second components. The first component is user-independent and reflects first probabilities of occurrence of the current values of the risk predictors across all the users over an operating period. The second component is user-dependent and reflects second probabilities of occurrence of the current values of the risk predictors for the given user over the operating period.

At 70, a risk assessment response is returned to the agent 18. The risk assessment response includes the risk score or a value derived therefrom that is usable by the agent 18 to selectively prevent, allow, or modify the transaction by the user. "Modify" may include allowing the transaction only upon obtaining additional information and making further assessment(s) locally or in further consultation with the risk engine 12 as a condition to allowing the transaction. It may also include allowing the user to perform a more limited version of the original transaction that is inherently less risky.

Figure 6:
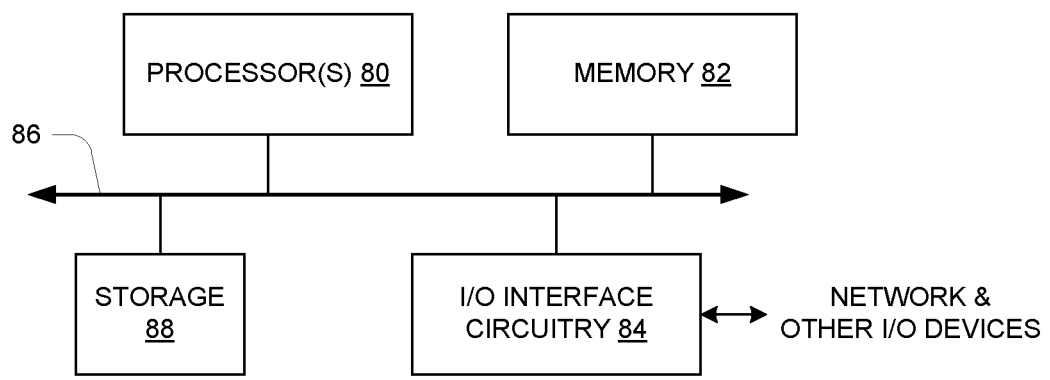
FIG. 6 is a block diagram of a computer from a hardware perspective.

FIG. 6 shows an example configuration of a physical computer such as the risk engine computer 12 or computer of the protected system 14 from a computer hardware perspective. The hardware includes one or more processors 80, memory 82, and interface circuitry 84 interconnected by data interconnections 86 such as one or more high-speed data buses. The interface circuitry 84 provides a hardware connection to a network for communicating with other computers and perhaps other to external devices/connections (EXT DEVs). The processor(s) 80 with connected memory 82 may also be referred to as "processing circuitry" herein. There may also be local storage 88 such as a local-attached disk drive or Flash drive. In operation, the memory 82 stores data and instructions of system software (e.g., operating system) and one or more application programs which are executed by the processor(s) 80 to cause the hardware to function in a software-defined manner. Thus the computer hardware executing instructions of a risk engine application, for example, can be referred to as a risk engine circuit or risk engine component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

The method described herein allows dynamic learning of patterns in multi-variable time series that does not rely on manual feedback, nor does this method rely on complex sets of policy rules. On the other hand, the modular nature of the method enables breaking-down the overall risk score associated with an event into meaningful components that in turn can be fed into the policy manager. The method may be used by itself or in conjunction with more traditional "supervised" methods to achieve desired performance in detecting fraudulent events.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a risk-engine computer, comprising:

loading, by the risk-engine computer, non-zero initial counts into a risk engine operated by the risk-engine computer, the initial counts indicating expected counts that risk model will acquire over time, the risk model, by the risk-engine computer, generating risk scores based at least in part on aggregate counts of (i) risk predictor values in respective categories for respective users, (ii) risk predictor values for respective risk predictors, and (iii) risk predictor values in respective categories;

executing, by the risk-engine computer in response to requests received from a protected computer system in communication with the risk-engine computer, the risk model over successive time windows, including (i) aging out the initial counts over a course of multiple successive time windows and (ii) acquiring new counts based on transactions processed by the risk engine after loading the initial counts; and continuing to age out the initial counts while also aging out the new counts over further successive time windows, thereby enabling the risk model to adapt to changes over time, wherein the method further comprises obtaining the initial counts based on a preliminary study of logins over a designated period of time, and, when acquiring new counts, selectively updating the counters to reflect the new counts based on whether authentication results produced by the risk engine indicate successful authentication.

2. The method of claim 1, further comprising obtaining the initial counts based on counts accumulated from operation of a different instance of the risk model.

3. A computer program product including a set of non-transitory, computer-readable media having instructions which, when executed by control circuitry of a risk-engine computer, perform steps of operating the risk-engine computer, the steps comprising:

loading, by the risk-engine computer, non-zero initial counts into a risk engine operated by the risk-engine computer, the initial counts indicating expected counts that risk model will acquire over time, the risk model, by the risk-engine computer, generating risk scores based at least in part on aggregate counts of (i) risk predictor values in respective categories for respective users, (ii) risk predictor values for respective risk predictors, and (iii) risk predictor values in respective categories;

executing, by the risk-engine computer in response to requests received from a protected computer system in communication with the risk-engine computer, the risk model over successive time windows, including (i) aging out the initial counts over a course of multiple successive time windows and (ii) acquiring new counts based on transactions processed by the risk engine after loading the initial counts; and continuing to age out the initial counts while also aging out the new counts over further successive time windows, thereby enabling the risk model to adapt to changes over time, wherein the steps further comprise obtaining the initial counts based on a preliminary study of logins over a designated period of time, and, when acquiring new counts, selectively updating the counters to reflect the new counts based on whether authentication results produced by the risk engine indicate successful authentication.

4. The computer program product of claim 3, where the steps further comprise obtaining the initial counts based on counts accumulated from operation of a different instance of the risk model.

5. A risk-engine computer, comprising control circuitry that includes a set of processing units coupled to memory, the control circuitry constructed and arranged to:

load non-zero initial counts into a risk engine operated by the risk-engine computer, the initial counts indicating expected counts that risk model will acquire over time, the risk model, by the risk-engine computer, generating risk scores based at least in part on aggregate counts of (i) risk predictor values in respective categories for respective users, (ii) risk predictor values for respective risk predictors, and (iii) risk predictor values in respective categories;

execute, in response to requests received from a protected computer system in communication with the risk-engine computer, the risk model over successive time windows, including (i) aging out the initial counts over a course of multiple successive time windows and (ii) acquiring new counts based on transactions processed by the risk engine after loading the initial counts; and continue to age out the initial counts while also aging out the new counts over further successive time windows, thereby enabling the risk model to adapt to changes over time, wherein the control circuitry is further constructed and arranged to obtain the initial counts based on a preliminary study of logins over a designated period of time, and, when new counts are acquired, selectively update the counters to reflect the new counts based on whether authentication results produced by the risk engine indicate successful authentication.

6. The risk-engine computer of claim 5, where the control circuitry is further constructed and arranged to obtain the initial counts based on counts accumulated from operation of a different instance of the risk model.

* * * * *